United States Patent Office 2,849,199
Patented Aug. 26, 1958

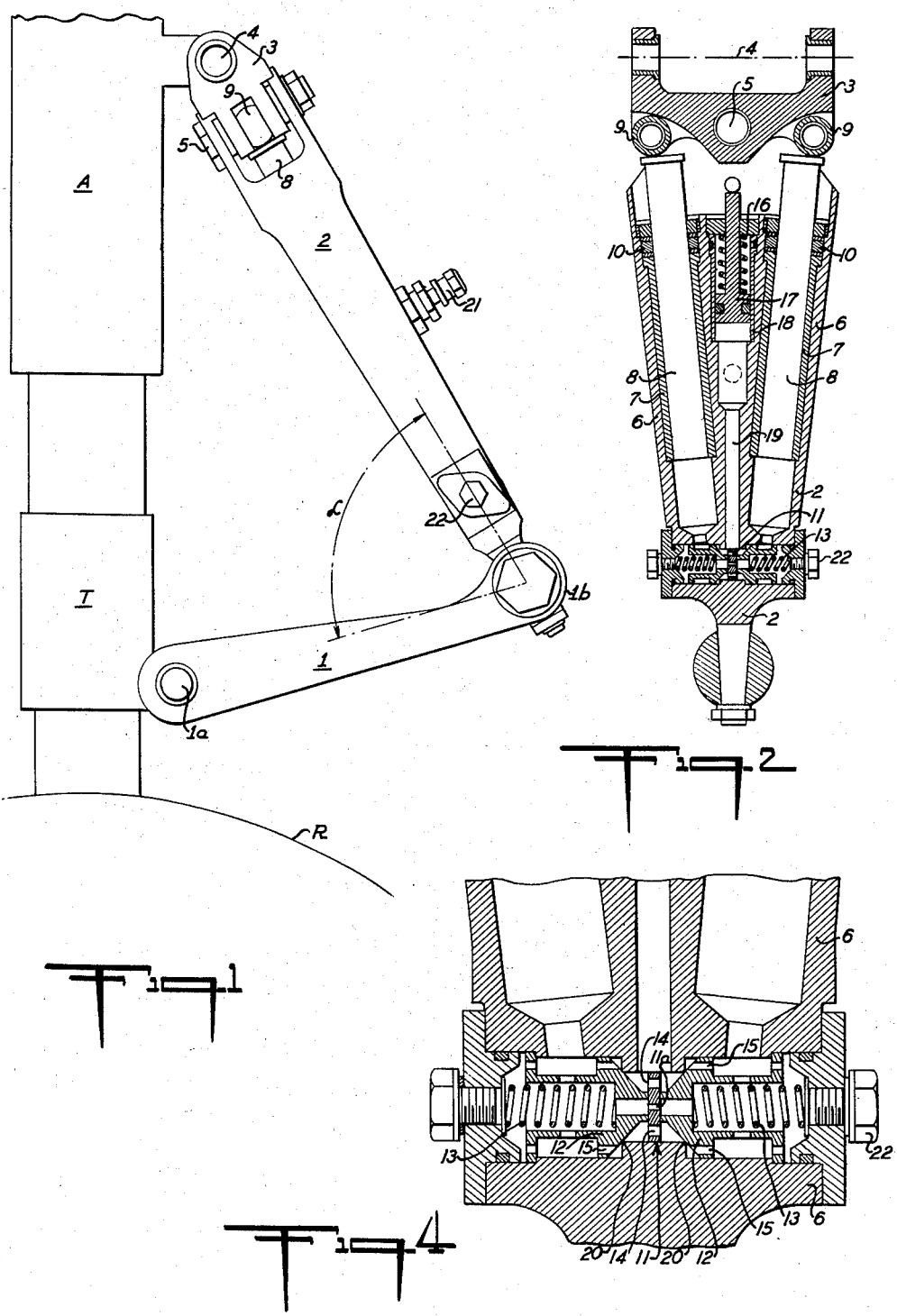

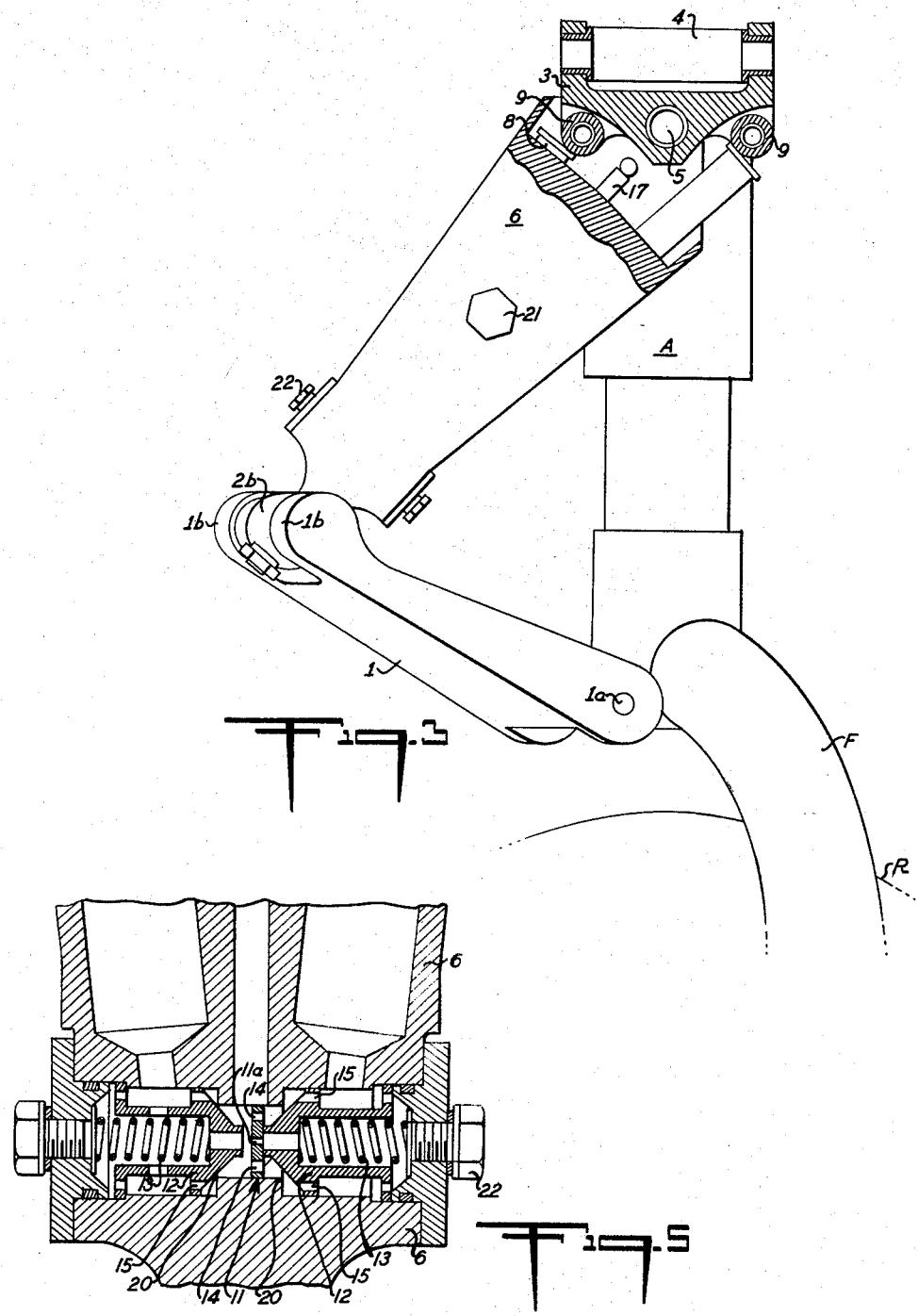

2,849,199

AIRCRAFT UNDERCARRIAGE

Rene Lucien, Paris, France

Application December 28, 1954, Serial No. 478,149

Claims priority, application France January 1, 1954

2 Claims. (Cl. 244—104)

This invention relates to an aircraft undercarriage. Constructions are widely known which include linkages between sliding parts of the undercarriage leg.

The purpose of such devices, one of which was originally described in French Patent No. 748,053 in the name of George Messier, is to keep an aeroplane wheel constantly in a normal running plane, while permitting freedom of action to the undercarriage in its compression and expansion movements.

It is an object of the present invention to give the known undercarriage linkage a certain amount of torsional freedom in relation to the axis of the undercarriage leg, while introducing into said linkage a couple opposing the wobble movement which the wheel may tend to adopt while taxiing.

One embodiment of the invention will now be described by way of example, with reference to the accompanying drawings in which:

Figure 1 is a view of the linkage in elevation in the plane of the wheel;

Figure 2 is a view in longitudinal axial section of the anti-wobble arm of the linkage;

Figure 3 is a perspective view showing the deformation of the linkage under a wobble effect exerted on it by the wheel; and Figures 4 and 5 are views on a larger scale of the system of orifices and valves.

The undercarriage comprises a fixed upper portion A in which slides a tubular leg T which carries a wheel R by means of a fork-bracket F.

In the example illustrated there is a lower link 1 which is rigid. Articulated at 1a either to the leg T or to the fork F of said wheel (Figure 3), it is provided at its opposite end, with female members 1b—1b of a ball-and-socket joint in which the upper link 2 of the linkage is articulated by means of a male member 2b of the ball-and-socket joint.

At its opposite end, the link 2 is articulated to the cylinder A of the undercarriage by means of a hook type universal joint member 3 the axes of which are numbered 4 and 5. The body 6 of the link 2, which is of unitary structure, is pivoted on the axis 5. This body 6 has two bores in which are mounted two sleeves 7—7 (Figure 2). These sleeves 7—7 serve as cylinders for pistons 8—8, which rest against rollers 9—9 carried by the member 3. Stuffing-boxes 10—10 ensure the sealing of the pistons as they enter their respective cylinders. The bores in the body 6 below the pistons 8—8 are filled with liquid and normally communicate through the narrow central orifice 11a in a valve-disc 11 which is held between two other valves 12—12, under the action of springs 13—13. The valve-disc 11 also has orifices 14—14 and the valves 12, orifices 15—15, all having a relatively larger cross-sectional area than the orifice 11a.

This anti-wobble linkage operates as follows:

When the wheel is not wobbling the linkage acts in the known manner, that is to say, by variation of the angle between its arms 1—2 it permits the movement of the undercarriage A while the pistons 8 remain stationary in their sleeve-cylinders 7.

On the other hand, if the wheel R receives an impulse which tends to displace it from its normal plane of rotation, this movement causes a displacement of the movable portion (wheel fork) in relation to the fixed portion (undercarriage housing) as shown in Figure 3. The whole of the body 6 turns in relation to the universal joint member 3 about the axis 5 thereof, causing a displacement of the pistons 8, one of these plunging into its sleeve while the other emerges to an equal extent, except for the kinematic differences. The presence of the rollers 9, by means of which the wobble movement is transmitted to the pistons, prevents this transmission from being accompanied by stresses which might cause harmful friction of the pistons 8 in their sleeves.

The reciprocal displacement of these pistons causes a transfer of liquid through the orifice 11a in the valve disc 11 (Figure 4) one way or the other, causing a damping effect which counteracts the wobble of the wheel.

The valves 12—12 constitute stress-limiting devices. For example, if the left-hand piston 8 descends (Figure 2) and the stress applied to the valve disc 11 by the liquid under pressure exceeds the force exerted by the corresponding spring 13, the right-hand limiting valve 12 is pushed back, compressing its spring 13, and leaves its seating (Figure 5). Consequently, the orifices 14—14 in the valve disc 11 and 15—15 in the right-hand valve 12 are added to the passage offered to the liquid by the orifice 11a.

Thus the amount of torsional liberty permitted by the flexible anti-wobble linkage is limited to any desired extent depending on the strength of the springs 13 and the dimension of the orifice 11a.

In order to avoid any cavitation phenomena, the liquid contained in the body 6 is constantly subjected to a slight pressure by the action of a spring 16 acting on a small auxiliary piston 17 movable in a cylinder 18 provided in the body 6 and extended by a duct 19 emerging on either side of the valve disc 11. In order for this exertion of pressure to be effective, the two valves 12—12 abutting against the valve disc 11, have a slight clearance on their respective seatings 20. The auxiliary piston 17 has a short stroke permitting it to absorb the expansion or contractions of the liquid as well as the minor differences in stroke between the main pistons 8—8, which may result either from the kinematics or from possible variations in wear.

The cylinders are filled with oil or other suitable liquid through a valve 21, and are drained by means of a screw 22.

It should be noted that the design of the flexible linkage permits considerable steering angles which may amount to 80°.

Finally the device also offers the advantage of taking up very little room and being light in weight.

I claim:

1. In the combination of an aircraft gear having telescoping members with an anti-shimmy compass device having arms pivoted respectively to the said telescoping members, and wherein one of said arms includes coupled hydraulic elements mutually permitting but damping oscillations of said landing gear laterally of a line of travel: said one arm comprising a unitary structure incorporating said hydraulic elements in a single body, valve means establishing a permanent communication between said hydraulic elements inside of said body, and at least one narrow restricted passage in said valve means, said valve means comprising a main valve having said narrow restricted passage therein, two auxiliary stress-limiting valves interposed respectively between the opposite sides of said main valve and the related hydraulic element, a passage in each auxiliary valve facing said narrow restricted passage, a spring urging each auxiliary valve into contact with said main valve, and at least one additional passage in said main valve outside of the zones of contact therewith of said auxiliary valves.

2. In the combination of an aircraft landing gear having telescoping members with an anti-shimmy compass device having arms pivoted respectively to said telescoping members, and wherein one of said arms includes coupled hydraulic elements mutually permitting but damping oscillations of said landing gear laterally of a line of travel: said one arm comprising a unitary structure incorporating said hydraulic elements in a single body, valve means establishing a permanent communication between said hydraulic elements inside of said body, and at least one narrow restricted passage in said valve means, an auxiliary cylinder communicating with said coupled hydraulic elements, a piston in said auxiliary cylinder, and a spring urging said piston in a direction to convey fluid from said auxiliary cylinder toward said hydraulic elements.

References Cited in the file of this patent

UNITED STATES PATENTS

| | | |
|---|---|---|
| 1,791,193 | Chryst | Feb. 3, 1931 |
| 1,834,439 | Veitch | Dec. 1, 1931 |
| 2,336,203 | Warner | Dec. 7, 1943 |
| 2,580,064 | Albright | Dec. 25, 1951 |

FOREIGN PATENTS

| | | |
|---|---|---|
| 124,005 | Australia | Apr. 11, 1947 |
| 508,158 | Great Britain | June 27, 1939 |